(No Model.)

P. P. DE BOGORY.
VEHICLE WHEEL.

No. 416,095. Patented Nov. 26, 1889.

WITNESSES:
Chas. Nida
C. Sedgwick

INVENTOR
P. P. De Bogory
BY
Munn & Co
ATTORNEY

UNITED STATES PATENT OFFICE.

PROGORE P. DE BOGORY, OF GENEVA, ASSIGNOR TO HIMSELF, AND JAMES H. LEE, OF OIREDA, FLORIDA.

VEHICLE-WHEEL.

SPECIFICATION forming part of Letters Patent No. 416,095, dated November 26, 1889.

Application filed February 27, 1889. Serial No. 301,336. (No model.)

*To all whom it may concern:*

Be it known that I, PROGORE P. DE BOGORY, of Geneva, in the county of Orange and State of Florida, have invented a new and Improved Vehicle-Wheel, of which the following is a specification, reference being had to the annexed drawings, forming a part thereof, in which—

Figure 1:
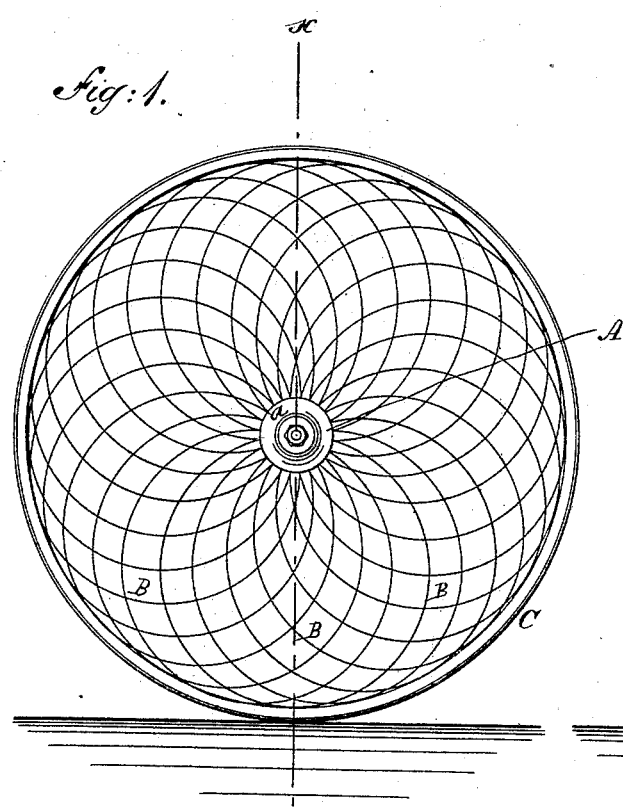
Figure 2:
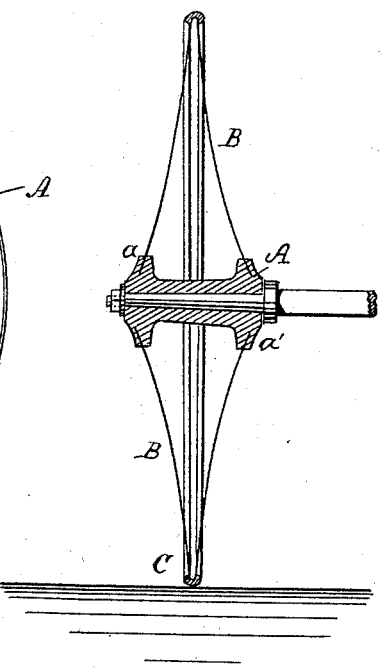
Figure 3:
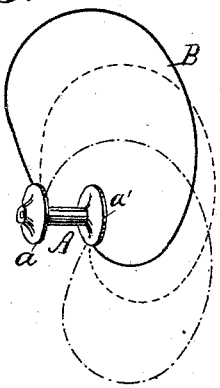
Figure 4:
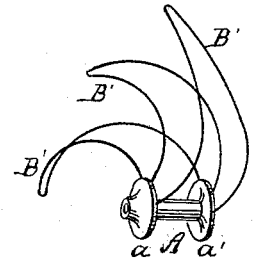

Figure 1 is a side elevation of my improved vehicle-wheel. Fig. 2 is a vertical transverse section taken on line $x\ x$ in Fig. 1. Fig. 3 is a perspective view of a hub with a single wire loop attached thereto, and Fig. 4 is a perspective view of a hub provided with a series of wire loops of modified form.

Similar letters of reference indicate corresponding parts in all the views.

The object of my invention is to construct a flexible wheel for vehicles which will yield with the load, and which will present to the road a larger contact-surface than the ordinary wheel.

My invention consists in a wheel formed of a hub, a series of spokes formed of loops of spring-wire, and a flexible tire adapted to receive the spokes, all as hereinafter more fully described.

The hub A is preferably formed of cast-iron, with flanges $a\ a'$ upon opposite ends thereof. In the said flanges are inserted the ends of loops B, which form the spokes of the wheel, one end of each loop being inserted in the flange $a$ and the opposite end being inserted in the flange $a'$. The said loops B are preferably made of approximately spiral form, as shown in Figs. 1 and 3; but they may be made in the form of a narrow curved loop, as shown in Fig. 4. In both instances the loops have their ends in different planes, so that they may be secured to opposite ends of the hub. The outer portions of the several loops form a single circular periphery, to which is fitted a rounded elastic rubber tire C, having an internal groove for receiving the spokes B. The form of the tire causes it to retain its position upon the curved loops or spokes B.

My improved wheel may be used upon an ordinary axle in the same manner as other vehicle-wheels; or, in the case of road-locomotives driven by steam or electricity, the wheels may be fixed to the axle and used as drive-wheels. In this case the flattening of the periphery of the wheel by the load gives the wheel increased traction. After the loops B are flattened by the rolling of the wheel upon the road they regain their normal shape by their own elasticity.

My wheel can be applied not only for vehicles, but pulleys built on the same principle can be applied for driving fast-running machinery, planers, &c., by the belt, and with this pulley the belt could be quite slack, and when the machine starts centrifugal force will enlarge the wheel and will tighten the belt.

Having thus described my invention, I claim as new and desire to secure by Letters Patent—

1. In a vehicle-wheel, the combination, with a hub, of a series of spring-metal loops forming spokes, each loop being connected at both of its ends to the hub at opposite ends thereof, and a flexible tire inclosing the outer bowed portions of the loops, substantially as set forth.

2. In a vehicle-wheel, the combination of the hub A, provided with the flanges $a\ a'$, the spring-wire loops B, and the elastic tire C, substantially as set forth.

3. A vehicle-wheel having its spokes formed of wires bowed to form spring-metal loops, the ends of each loop being adjacent but lying in different planes, substantially as set forth.

4. A wheel-spoke formed of a bowed spring-wire having a spiral form, substantially as set forth.

5. A vehicle-wheel comprising a hub, an elastic tire, and bowed spring-wire spokes secured at their bends to the tire and at their ends to the hub, substantially as set forth.

PROGORE P. DE BOGORY.

Witnesses:
W. A. JELKZ,
ANDREW AULIN.